United States Patent [19]

Hartmann et al.

[11] 3,835,997
[45] Sept. 17, 1974

[54] MOBILE DEVICE FOR RECEPTION, PRECLEANING AND PILING OF BEETS

[75] Inventors: Heinrich Hartmann; Siegfried Stelter, both of Hondelage; Heinz-Gunter Trelewsky, Braunschweig, all of Germany

[73] Assignee: Braunschweigische Maschinebauanstalt, Braunschweig, Germany

[22] Filed: Mar. 22, 1973

[21] Appl. No.: 343,862

[30] Foreign Application Priority Data
June 2, 1972 Germany............................ 2226740

[52] U.S. Cl...................... 209/73, 209/247, 214/46
[51] Int. Cl................................................. B07c 1/04
[58] Field of Search...... 209/73, 85, 247 X; 214/45, 214/46 X, 49

[56] References Cited
UNITED STATES PATENTS

| | | | |
|---|---|---|---|
| 675,119 | 5/1901 | Wagner................................ | 214/46 |
| 698,528 | 4/1902 | Mabus et al. ........................ | 214/46 |
| 933,306 | 9/1909 | Jenkins.............................. | 214/46 X |
| 1,432,195 | 10/1922 | Lynch................................ | 214/46 X |

*Primary Examiner*—Robert B. Reeves
*Assistant Examiner*—Joseph J. Rolla
*Attorney, Agent, or Firm*—Wolfgang G. Fasse; Willard W. Roberts

[57] ABSTRACT

A mobile device for reception, precleaning and piling of sugar beets using an end-tipping device as discharging equipment for beet delivering vehicles, a precleaning device for dirt separation and a laterally and vertically sluable overhand beam with a conveyer to pile the sugar beets. A folded flap is arranged between the tipping platform and the ramp for the end-tipper and forming a part of the passable bottom of the tipper in its lower position. In its upward position the flap defines a collecting area in combination with one lateral wall at the outside of the tipper for receiving the sugar beets falling off the dumping vehicle which is immediately emptied from beets by a conveyer in the bottom area. This conveyer moves the beets into an intermediate bin so that the tipper is ready for a further discharging operation during which the intermediate bin is emptied and the conveyer in the bottom area transports the beets in a direction transverse of the length of the end-tipper.

10 Claims, 10 Drawing Figures

MOBILE DEVICE FOR RECEPTION, PRECLEANING AND PILING OF BEETS

BACKGROUND OF THE INVENTION

This invention relates to equipment for use in the processing of sugar beets, and more in particular to equipment for the unloading of beets from vehicles, the precleaning of the sugar beets, and the piling of the beets in a suitable area.

Two types of mobile devices for beet reception are known. As mentioned above, one type is equipped with an end-tipper whereas the other type has a lateral tipper. However, these two devices known are extremely big and heavy. Since the devices are mobile, great weight and size is undesirable.

Comparing the capacities of the devices known, those equipped with a lateral tipper are superior to those equipped with an end-tipping device. It is impossible, however, to use lateral tippers universally, since the retaining devices supporting the vehicle in an inclined position when tipping must be adjusted to the location of the fenders, etc. the wheel base of the beet delivering vehicles may vary to a large extent as well as the size of the wheels and the shape and arrangement of the rigs and fenders depending upon the type of vehicle. Many well-known trucks therefore cannot be tipped laterally since there is a risk of oil or fuel leakage.

Mobile devices, as mentioned above, are capable of unloading beet delivering vehicles of all kinds since the vehicles are protected at the end and not laterally from sliding off the tipping platform. In order to be able to unload vehicles of all kinds, it has been necessary to cope with the disadvantage of a low capacity. Since, when using an end-tipper, the beets are tipped into the collecting gap between the tipping platform and the ramp. The folded flap cannot be closed until the beets unloaded are removed. As long as the folded flap is open, it is impossible for any beet supplying vehicle to enter the ramp. The interval between two tipping processes thus does not depend upon the efficiency of the tipping platform but exclusively upon the conveying efficiency providing for removal of the beets from the collecting gap. Since this is a mobile device, it is impossible to use a bin as collecting region. Despite this very unsatisfactory efficiency, known mobile devices with end-tippers are not substantially smaller or lighter than those mobile devices with lateral tippers. They have two chassis frames linked to one another with a total of 12 sets of wheels; the dead weight of such devices known is around 150 tons, and a maximum of 15 tipping processes may be executed per hour assuming a beet quantity of about 200 tons per hour.

OBJECT OF THE INVENTION

It is therefore an object of this invention to provide equipment for the unloading, precleaning and piling of sugar beets that overcomes the above mentioned disadvantages of known equipment.

It is also an object of this invention to provide a mobile device for the unloading of sugar beets, that is designed as an end-tipping device to obtain the advantage with respect to its ability to unload many different types of vehicles, and that has reduced weight and increased unloading capacity as compared with the known devices.

It is a further object of this invention to provide a mobile end-tipping unloading device for sugar beets that permits the more rapid movement of vehicles to be unloaded through the device, as compared with the known devices.

SUMMARY OF THE INVENTION

Briefly stated, in accordance with the invention, in order to achieve the above objects, a tipping device is provided comprising a conveyer, which serves for removal of the beets from the collecting region, and which is designed in the form of a large loop enclosing the collecting region in front of the folded flap, the precleaning device, as well as the end-tipper. The device also is provided with an intermediate bin beside the collecting region in the transporting direction of the conveyer, for temporary storage of the total amount of beets tipped into the collecting region.

In order to transport the beets from the intermediate bin to the precleaning device in an especially advantageous manner, the device according to the invention is arranged so that the conveyer in the loop section forms an elevator between the intermediate bin and the precleaning device.

In a useful design of the device according to the invention the conveyer is an endless belt and is equipped with carriers running transversely to the conveying direction and upright to the belt surface.

The conveyer, however, is preferably a scraper conveyer with lateral chains and with scraper bars assembled between the chains and transversely to the conveying direction. The conveyer runs through a channel in the loop area between the intermediate bin and the precleaning equipment, the inner section of the channel being adjusted to the scraper bars.

Thus a particularly simple and strong elevator is created by means of which the beets can be transported in an almost vertically inclining direction to the precleaning equipment.

It is of an advantage for the conveying process if the bottom of the intermediate bin grades or slopes into the outside wall of the channel in an arcuate section.

According to another feature of the invention the channel is extended to the inside of the intermediate bin and has an adjustable inlet opening in the conveying direction.

Owing to these measures the intake opening of the channel can be adjusted so that the best possible protective treatment of the beets is guaranteed and simultaneously the desired conveying capacity is achieved. Since the natural quality of the beets, in particular the size of the beets, vary continuously, the conditions necessary for an optimum protection of the beets during the conveying process and the conditions necessary for the capacity of the conveyer vary so that the adjustability of the intake opening into the channel is of great importance.

An adjustable intake opening of the channel is provided in a particularly simple way by limiting that part of the channel which projects into the intermediate bin on its outside by the arched bottom of the intermediate bin and on its inside by a wall element being movable in the conveying direction.

According to another feature of the invention the arched bottom of the intermediate bin within the range of the channel inlet opening is designed flexibly transversely to the conveying direction.

This design is of substantial importance for a protective treatment of the beets, for when entering the channel, the individual beets lie in a relatively disorderly fashion and are not in that position which would be most favorable for gentle passing through the channel section. Due to reciprocal shifting of a certain quantity of the beets, this most favorable position is achieved automatically during the conveying process. If, however, the outside wall of the channel, i.e., the area of the bottom of the intermediate bin serving as outside wall is designed flexibly, then the individual beets will be treated protectively until they occupy the most favorable position since the wall area gives flexibly under the pressure exerted by the beets lying in an unfavorable position.

The flexible area of the bottom of the intermediate bin may consist of elastomeric material.

A better resistance to wear, however, is achieved when the flexible area of the intermediate bin consists of plates that are flexibly supported.

BRIEF FIGURE DESCRIPTION

In order that the invention will be more clearly understood, it will now be described in greater detail with reference to the accompanying drawings, in which.

DETAILED DESCRIPTION OF EXAMPLE EMBODIMENTS

The figures represent a design of the mobile equipment I according to the invention for receiving, precleaning and piling beets. The device I has a chassis frame 2 equipped with five sets of wheels 3. They may be any type of floor wheels or rail wheels. The chassis frame 2 can be lifted and lowered in relation to its sets of wheels. The chassis frame is lowered to its bottom position for operation.

An end-tipper 4 is assembled on the chassis frame. The end-tipper is equipped with a ramp 5 for the vehicles arriving to unload beets, a ramp 6 for vehicles to leave after the beets have been unloaded and a tipping platform 7. A folded flap 8 is assembled between the tipping platform 7 and the ramp 5.

Figure 1:
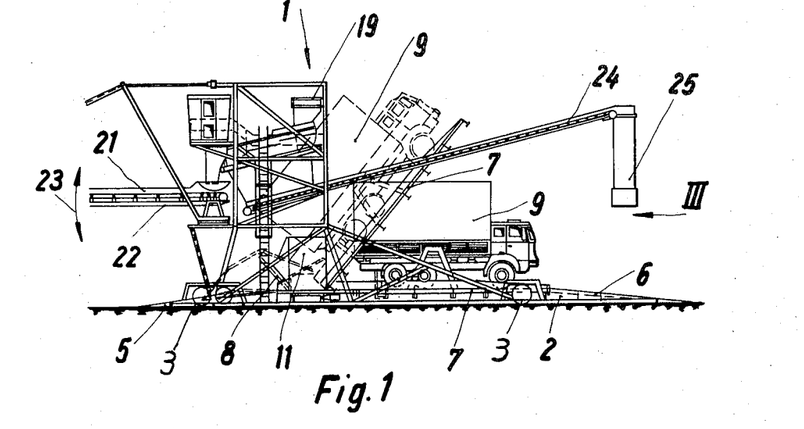
FIG. 1 is a side view of a device according to the invention.
Figure 3:
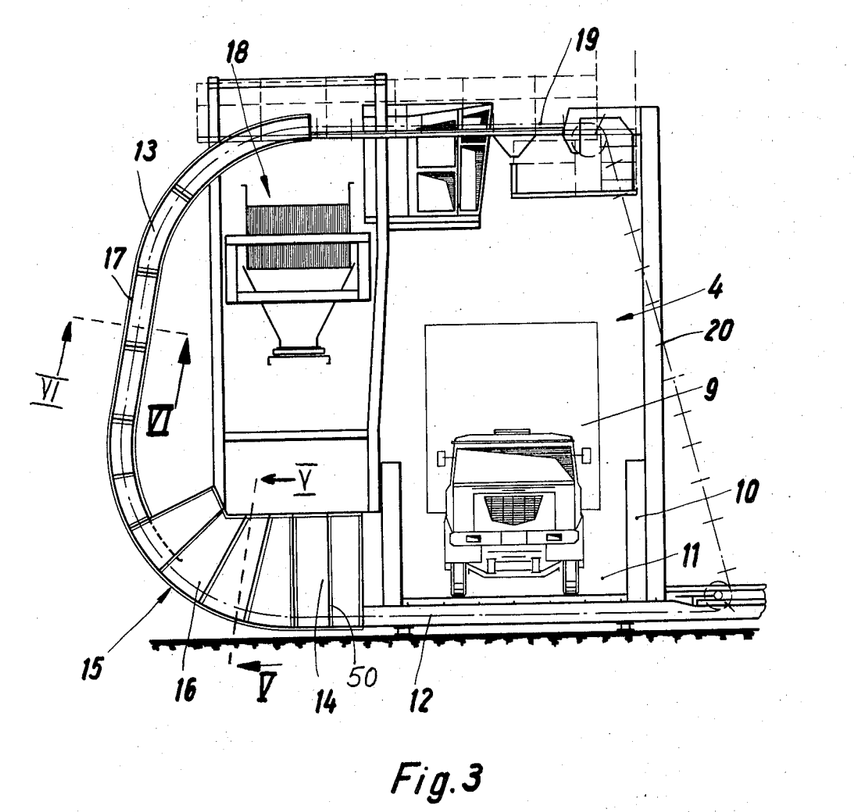
FIG. 3 shows the front view of the present device as seen when looking in the direction of the arrow III in FIG. 1.

When a vehicle 9 is driven onto the tipping platform 7, the folded flap 8 constitutes part of the passable bottom of the end-tipper 4. The folded flap is lifted for tipping as shown in FIG. 1. It defines, in combination with a lateral wall 10 at the outside of the end-tipper 4, a collecting region II into which the sugar beets fall after being unloaded from the tipped vehicle. The wall 10 is shown more clearly in FIG. 3.

A lower horizontal part 12 of an endless conveyer 13 runs through the bottom area of the tipper, the conveyer being designed in the form of a wide loop. As can be seen in FIG. 1, when the flap 8 is in its upper position, as seen in dashed line, its lower front edge, i.e., the edge toward the vehicle being unloaded, is in a position so that beets are directed downwardly to the conveyer. The wall 10 (FIG. 3) is aligned with the conveyer to aid in the direction of beets onto the conveyer. Consequently the beets are loaded onto the conveyer in a pile. The beets tipped from the beet supplying vehicle into the collecting region 11 are carried as a whole in the form of a pile by this lower part 12 of the conveyer 13, and thence are transported into the intermediate bin 14 located adjacent the side of the collecting region 11. Therefore the collecting region 11 is emptied immediately after the tipping process so that the folded flap 8 may be closed again in preparation for the next tipping process. The endless conveyer 13 extends through the area along the bottom 15 of the intermediate bin 14 having structural ribs 50. Intake opening 16 of a channel 17 extends into the intermediate bin 14. This channel 17 together with the conveyer 13 constitutes an elevator through which the beets from the bin 14 are transported almost vertically to a precleaning device 18. The intake opening 16 of the channel 17 is adjustable in longitudinal direction of the channel in the bottom area of the intermediate bin 14 so that depending upon the quality and size of the beets the position may be chosen guaranteeing the optimum protective treatment of the beets and the best conveying capacity.

After the conveyer 13, upon leaving the channel 17 has delivered the beets to the precleaning device 18, it passes through an upper area 19 above the end-tipper 4, and then runs laterally outside the end-tipper 4 in a descending area 20 and returns to the bottom horizontal part 12. Thus a widely open loop is provided which encloses any equipment of device 1.

Known devices are equipped with an inclined scraper laterally beside the end-tipper, with its two ramps discharging the beets at the upper end into a precleaning equipment designed as screening device. At the bottom end, the inclined scraper is fed by a cross conveyer being assembled within the bottom area of the collecting region. Contrary to this, the invented equipment refrains from using inclined scrapers and cross conveyers, since only one conveyer is used forming an endless but widely open loop. In the known devices the inclined scraper requires its own chassis frame but the present device does not need another chassis frame. The total dimensions of the invented equipment are smaller since the conveyer for removal of the tipped beets encloses the precleaning device and the tipper so that a space-saving and compact setup is possible. A dead weight of approx. 90 tons of the present device as compared to the 150 tons of the known device means a substantial weight reduction. The total setup is simplified since the number of the required sets of wheels is reduced.

The device according to the invention can discharge up to 25 vehicles and more per hour so that a capacity of 300 tons per hour is achieved assuming an average loading weight of approximately 12 tons per vehicle. Compared to the known devices, this is almost twice as much. This result is achieved by avoiding the specific disadvantage of known end-tippers for mobile devices, since an intermediate bin is assembled beside the collecting region of the device according to the invention. The conveyer, which constitutes the endless, widely open loop extends with its lower part through the bottom of the collecting region, and also through the bottom of the intermediate bin. The pile of beets tipped into the collecting gap from the vehicle is not carried away continuously but is shifted as a whole, i.e., as complete unit — as pile — into the intermediate bin passing the bottom of the collecting region so that the collecting region is empty immediately after the tipping. The folding flap then may be closed and arrangements can be made for the next vehicle to be tipped. During this time the pile of beets is in the intermediate bin and from here it is slowly transported away with a velocity depending upon the efficiency of the conveyer. It is advisable to choose the capacity of the intermediate bin so that a balancing effect is obtained when alternately vehicles with a small and large loading weight are discharged.

Figure 2:
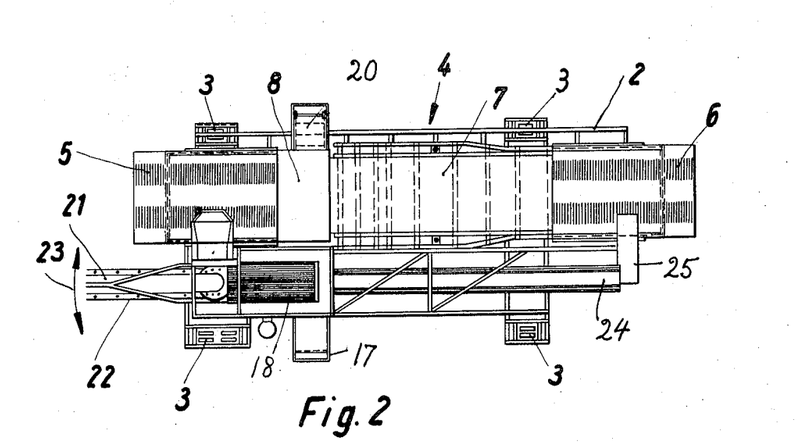
FIG. 2 is a plan view of the device according to the invention.

In order to clean the beets, the precleaning device 18 is designed as screening device where the dirt is separated from the beets. The precleaned beets are supplied to a belt conveyer 21 (FIGS. 1 and 2) supported by an overhang beam 22. The overhang beam 22 is only shown partially in the FIGS. 1 and 2. It can be lifted or lowered and moves laterally in the direction of the arrows 23 so that the beets can be stored at the desired locations of a beet piling area.

Figure 4:
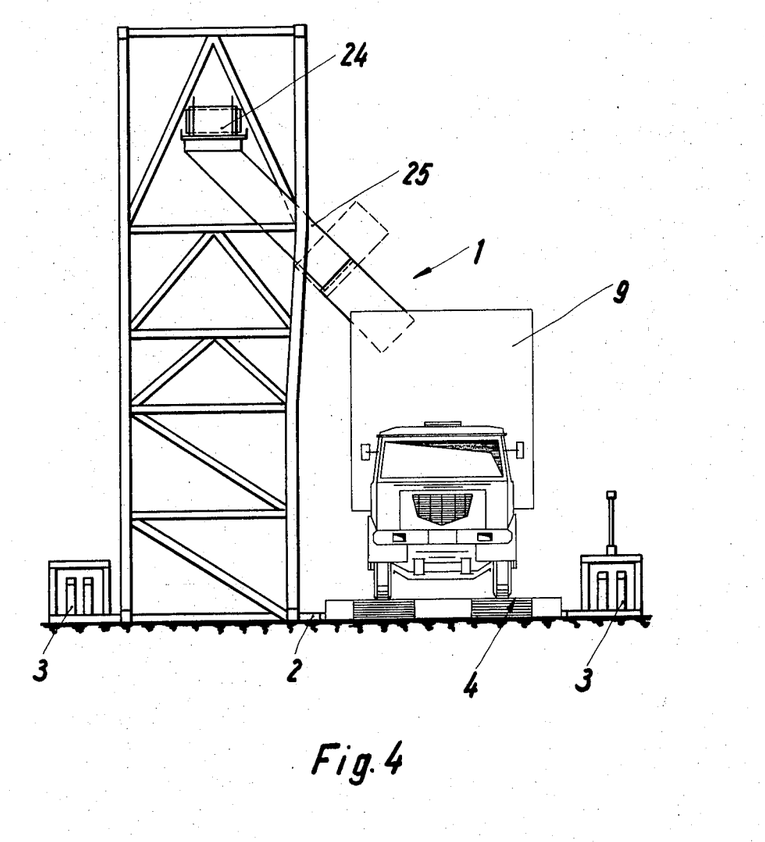
FIG. 4 is a simplified illustration of the device according to FIG. 3 and showing the manner of returning dirt to a beet delivering vehicle.

The dirt separated in the precleaning device 18 can be supplied simply to the side to an available dirt collecting place or on an available vehicle or the like. Rather frequently, however, the separated dirt is to be reweighed with the empty vehicle 9. If this is desired, the device 1 is equipped with a dirt conveyer 24 (FIGS. 1 and 4) having a chute 25 at its unloading end, the chute being located around the area of the ramp 6. This position of the chute 25 makes it possible for another vehicle to enter the end-tipper while the vehicle, which had been previously unloaded, receives dirt from the cleaned beets.

The conveyer 13 must advantageously be designed as scraper, since such a design has been proved to be successful. In this design, driven chains 26 (FIGS. 5 and 6) at both outer sides of the conveyer are guided in a conventional manner and are interconnected by scraper bars 27 running transversely to the conveying direction. The channel 17 is of such type that the inside cross section corresponds to the shape of the scraper bars (FIG. 6).

Figure 5:
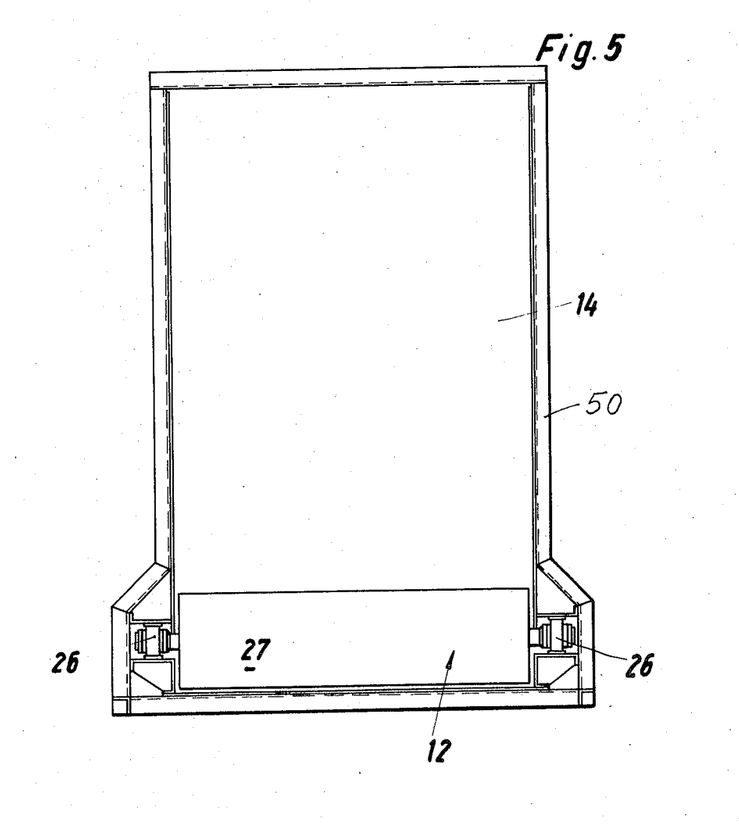
FIG. 5 is an enlarged sectional view of the sectional plane along the V—V line in FIG. 3.
Figure 6:
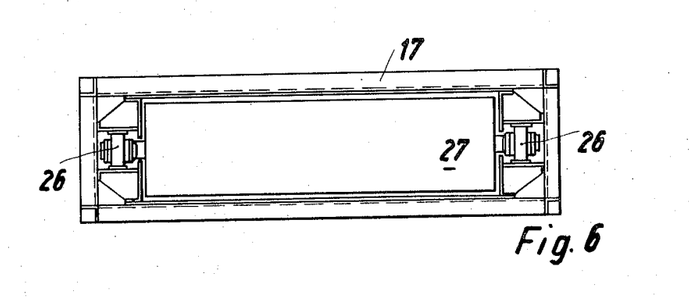
FIG. 6 is a section through the channel along the VI—VI line in FIG. 3.

FIG. 5 shows how the conveyer 13 with its scraper bars 12 extends through bottom area of the intermediate bin 14.

Figure 7:
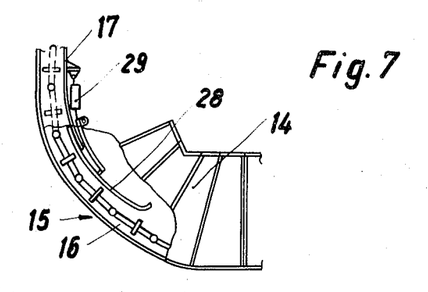
FIG. 7 is a schematic view of the intake end of the channel lying in the intermediate bin with the adjustable intake opening.

It is possible to adjust the inlet opening 16 of the channel 17 in longitudinal direction of the channel in a particularly simple way when a wall element 28 which is movable in longitudinal direction is used inside the intermediate bin 14, as shown in FIG. 7.

A hydraulic cylinder 29 can be used for mechanical adjustment of the wall 28.

Figures 8, 9, 10:
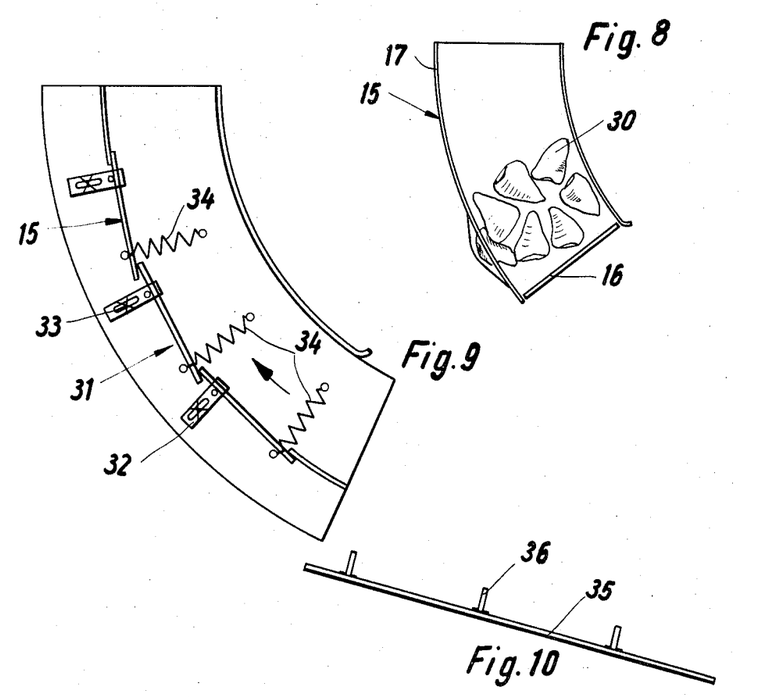
FIG. 8 is a schematic view of the intake area of the channel showing a design that may be employed for the flexible channel bottom.
FIG. 9 is a view according to the representation in FIG. 8 where the area of the bottom of the intermediate bin serving as channel wall is designed flexibly by means of spring-plate elements.
FIG. 10 is a partial side view of a conveyer belt with crossbars which can be used instead of the scraper belt shown in FIGS. 1 through 9.

The bottom 15 of the intermediate bin 14 can be flexible in the area of the inlet opening 16 of the channel 17 radially to the arch constituting the bottom thereof. This is achieved in a simple way by manufacturing this part of the bottom 15 of elastomeric material such as rubber. FIG. 8 shows how this wall area may be locally distorted by sugar beets 30. Thus a protective treatment of the beets is achieved when these enter the channel 17 coming from the area of the intermediate bin 14 so that the beets occupy the most favorable position.

Alternatively, in the design according to FIG. 9 no elastomeric material is used for the bottom, but partially arched plate elements 31 overlapping one another in scale-like fashion which are supported at one end with pin 32 in slots 33 and on the other end they are suspended on springs 34. Owing to the slot bolt guide the arched wall elements 31 are kept in their relevant positions and their precalculated position is opposed to the effect of the springs. When beets pass in an unfavorable position, the individual elements may yield.

Instead of a scraper with chains 26 and scraper bars 27, an endless belt 35 with vertical and horizontal carriers 36 can be used. Part of such a belt is represented in FIG. 10. When using such a belt it is to be noted that the carriers 36 also fill the cross section of the channel 17 so that the conveyer 13 in combination with the channel 17 may form an elevator.

Although the invention has been described with reference to specific example embodiments, it is to be understood, that it is intended to cover all modifications and equivalents within the scope of the appended claims.

What is claimed is:

1. In a mobile device for the reception precleaning and piling of sugar beets which employs an end-tipping device for discharging beets from beet delivering vehicles, and wherein the mobile device includes a precleaning device for separating dirt from the beets, a laterally and vertically sluable overhang beam with a conveyer for piling sugar beets, a folded flap arranged between a tipping platform and a ramp for the end-tipping device, the platform having a lower position in which it forms part of a passable platform for vehicles and an upper position in which it defines, in combination with a lateral wall, a collecting region for sugar beets from a vehicle, and a conveyer for transporting beets from the collecting region in a direction transverse to the longitudinal direction of the mobile device, the improvement wherein said conveyer encloses said collecting region on the end of said flap toward a vehicle being unloaded, said precleaning device and the end-tipping device, and wherein an intermediate bin is provided adjacent said collecting region on the side thereof in the transporting direction of said conveyer, whereby said intermediate bin provides temporary storage space for all of the beets tipped from a given vehicle.

2. The mobile device of claim 1, wherein the precleaning device is positioned higher than said intermediate bin, and wherein said conveyer comprises elevator means extending from said intermediate bin to said precleaning device.

3. The mobile device of claim 1, wherein the conveyer is an endless belt, further comprising carrier means extending transversely on said belt in upright positions with respect to the surface of the belt.

4. The mobile device of claim 1, wherein said conveyer is a scraper conveyer having lateral chains and scraper bars extending between the chains in a direction transverse to the direction of movement of said conveyer, further comprising a channel extending between said bin and said precleaning device, said conveyer extending through said channel, the internal dimensions of said channel being of substantially the same size as said scraper bars.

5. The mobile device of claim 4, wherein said intermediate bin has an arcuate transition section extending to said channel.

6. The mobile device of claim 5, wherein said channel extends into said bin, said channel having a longitudinally adjustable inlet opening in said bin.

7. The mobile device of claim 6, wherein one wall of said channel extends to said transition section and the opposite wall of said channel is comprised of longitudinally adjustable means.

8. The mobile device of claim 5, wherein said arcuate transition section has a flexible bottom.

9. The mobile device of claim 8, wherein said flexible bottom is made of an elastomeric material.

10. The mobile device of claim 8, wherein said flexible bottom is comprised of a plurality of spring supported plates.

* * * * *

Dedication 3,835,997.—*Heinrich Hartmann*, and *Siegfried Stelter*, Hondelage, and *Heinz-Guenter Trelewsky*, Braunschweig, Germany. MOBILE DEVICE FOR RECEPTION, PRECLEANING AND PILING OF BEETS. Patent dated Sept. 17, 1974. Dedication filed Dec. 3, 1979, by the assignee, *Braunschweigische Maschinenbauanstalt*.

Hereby dedicates the entire remaining term of said patent.

[*Official Gazette March 11, 1980.*]